Aug. 4, 1936.　　　F. GOLDMAN　　　2,050,093
SHOCKLESS TRAILER TONGUE ATTACHMENT
Filed Sept. 30, 1935
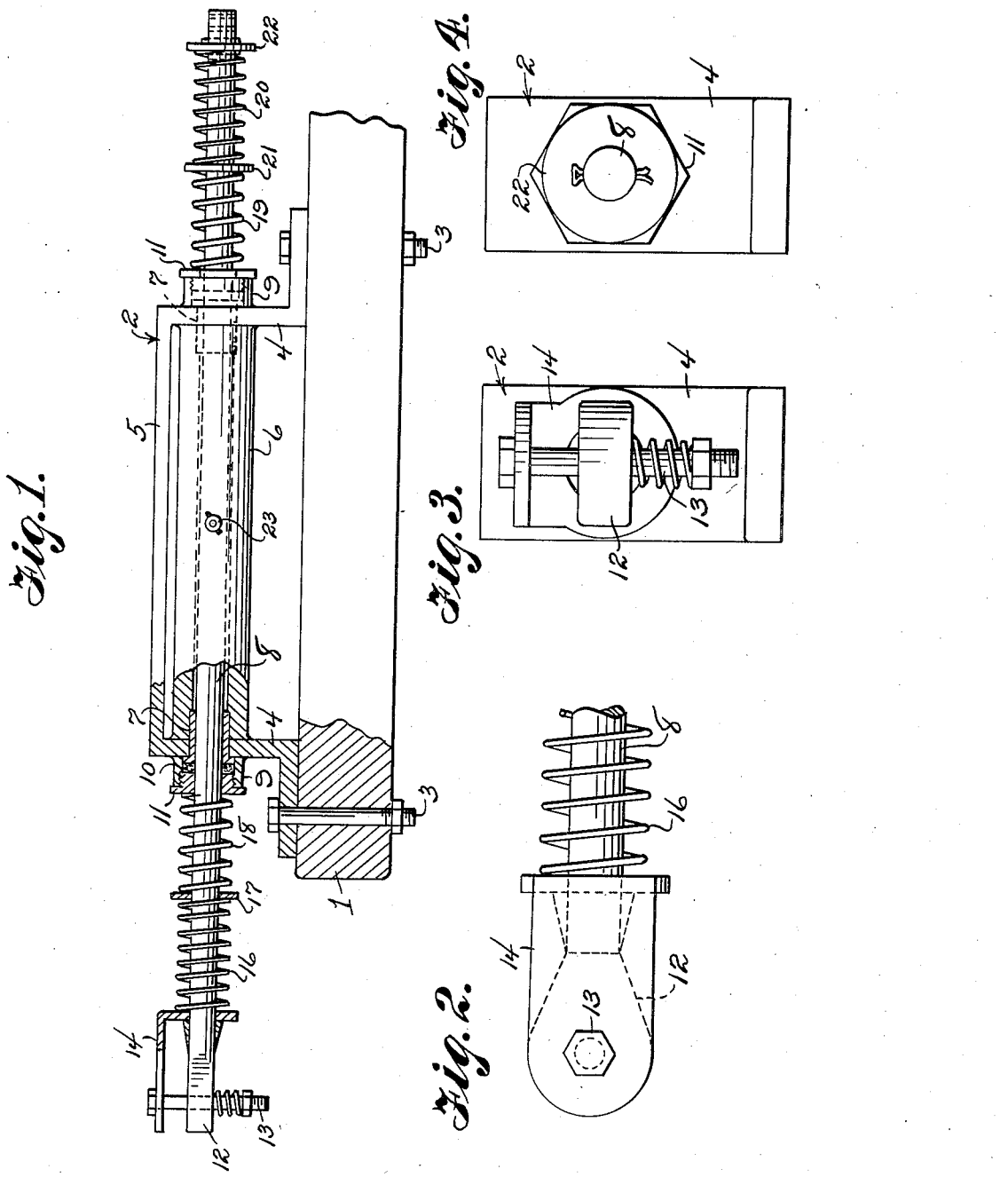
Floyd Goldman
INVENTOR
BY Victor J. Evans & Co.
ATTORNEY Patented Aug. 4, 1936

2,050,093

UNITED STATES PATENT OFFICE 2,050,093

SHOCKLESS TRAILER TONGUE ATTACHMENT

Floyd Goldman, Idaho Falls, Idaho

Application September 30, 1935, Serial No. 42,934

2 Claims. (Cl. 280—33.9)

This invention relates to a shockless trailer tongue attachment, and has for the primary object the provision of a device of this character which will provide a hitch between a trailer tongue and a towing vehicle capable of permitting quick and easy coupling and uncoupling of the towing vehicle with the trailer and which will efficiently absorb shocks caused by sudden stopping and starting of the towing vehicle and trailer and will prevent said shock from being transmitted either to the towing vehicle or to the trailer.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a side elevation, partly in section, illustrating a shockless trailer tongue attachment constructed in accordance with my invention.

Figure 2 is a fragmentary plan view showing one end of the hitch whereby the latter may be readily connected and disconnected from a towing vehicle.

Figure 3 is an end elevation illustrating said end of the hitch.

Figure 4 is a view similar to Figure 3, showing the opposite end of the hitch.

Referring in detail to the drawing, the numeral 1 indicates a fragmentary portion of a trailer tongue to which my invention is adapted. Secured to the tongue 1, by bolts or like fasteners 3, is a frame 2. The frame is offset from the top face of the tongue and includes parallel portions 4 and a connecting portion 5. Interposed between the parallel portions 4 and aligning with openings of the latter is a tubular member 6. Bushings 7 extend through the parallel portions 4 of the frame and enter the tubular member 6 for retaining the latter in the frame. The bushings slidably support a shaft 8, the length of which is considerably greater than the length of the tubular member 6. Packing sleeves 9 are integral with the parallel portions 4 of the frame and receive the outer ends of the bushings and also packing 10. Packing nuts 11 are threaded to the packing sleeves 9 for retaining the packing 10 tightly against the shaft 8 and also for retaining the bushings 7 in proper place. The shaft 9 projects forwardly of the forward end of the tongue 1 and has said end flattened and apertured, as shown at 12, to receive a coupling bolt 13 carried by a bracket 14. The bracket 14 is mounted on the shaft 8 and is engaged by one end of a coil spring 16, the opposite end of which engages a spacer 17 mounted on the shaft. A coil spring 18 is mounted on the shaft and interposed between the spacer 17 and one of the packing nuts 11. Similar springs 19 and 20 are mounted on the rear end portion of the shaft and are separated by a spacer 21 and one end of the spring 20 bears against a collar 22 adjustably secured to the shaft. The springs 16 and 20 are of lighter weight or weaker in strength than the springs 18 and 19. The shaft 8 may move in the cylindrical member 6 against the action of the springs and said cylindrical member 6 is slightly spaced from the shaft to form an oil chamber capable of receiving lubricant through a fitting 23, which lubricant is prevented from escaping by the packings 10.

In operation, the springs will yield when load is subjected to the shaft 8 permitting said load to be gradually taken up by the towing vehicle preventing sudden starting or jerking of the trailer. Consequently, the springs act as shock absorbing means so that sudden jerks will be absorbed and will be prevented from being transmitted either to the towing vehicle or to the trailer.

Having described the invention, I claim:

1. A hitch comprising a frame secured to a trailer tongue, a cylindrical member carried by said frame, a shaft slidable through said cylindrical member and adapted to be connected to a towing vehicle, bushings between the frame, tubular member and the shaft and acting to secure said tubular member to the frame, packing means between the shaft and frame, said tubular member being spaced from the shaft to define a lubricant chamber, and cushioning means between the shaft and frame.

2. A hitch comprising a frame secured to a trailer tongue, a cylindrical member carried by said frame, a shaft slidable through said cylindrical member and adapted to be connected to a towing vehicle, bushings between the frame, cylindrical member and the shaft and acting to secure said cylindrical member to the frame, packing means between the shaft and frame, said cylindrical member being spaced from the shaft to define a lubricant chamber, and pairs of coil springs mounted on the shaft between the latter and the frame and one spring of each pair being of a greater strength than the companion spring.

FLOYD GOLDMAN.